Nov. 28, 1939. M. W. McCONKEY Re. 21,280

BRAKE

Original Filed Dec. 3, 1923

Inventor
Montgomery W. McConkey
By his Attorneys
Blackmore, Spencer & Flint

Reissued Nov. 28, 1939

Re. 21,280

UNITED STATES PATENT OFFICE 21,280

BRAKE

Montgomery W. McConkey, Chicago, Ill., assignor to General Motors Corporation, Detroit, Mich., a corporation of Delaware Original No. 1,837,465, dated December 22, 1931, Serial No. 678,236, December 3, 1923. Application for reissue April 9, 1938, Serial No. 201,100

9 Claims. (Cl. 121—38)

This invention relates to booster brakes, that is, brakes which are applied by power or partly by power under the control of an operator, and is illustrated as embodied in a motor vehicle having such brakes applied under the control of the driver by power derived from the intake manifold of the engine.

Brakes of this character as heretofore designed have been open to one or both of two objections in that either the control was not sufficiently sensitive to permit the driver to apply the brakes accurately, or if such sensitive control was provided, it was by some kind of throttle action in which it was extremely difficult for the driver to gage the effect on the brakes.

An object of the present invention is to provide a very sensitive control for such power brakes in such a manner that the operator can readily determine the effect on the brakes. In one desirable arrangement, a driver-operated controlling member, such as a brake pedal, operates connections constructed to apply power to the brakes to an extent which is a predetermined multiple of the power applied to the pedal or its equivalent, the parts preferably being so arranged that when the engine is not running, or when for any other reason power is not available, the same pedal or other member can apply the brakes manually. In the embodiment shown in the drawings, movement of the brake pedal controls a valve which admits suction from the intake manifold or other source to a cylinder and piston connected to the brakes, the valve being of such a type that it automatically cuts off the suction when the desired effect on the brakes is reached.

Another feature of the invention relates to the provision of an indicator, shown as a visible indicator or gage which can be mounted on the instrument board, operated by the same power which is applied to the brakes so that it shows to the driver how much pressure is being exerted on the brakes. In the illustrated embodiment, a gage is connected to the above described cylinder in such a manner as to be operated by the suction acting on the brakes.

Other objects and features of the invention, including a novel valve operating automatically as explained above, and other novel combinations of parts and desirable particular constructions, will be apparent from the following description of one illustrative embodiment shown in the accompanying drawing, in which.

Figure 1:
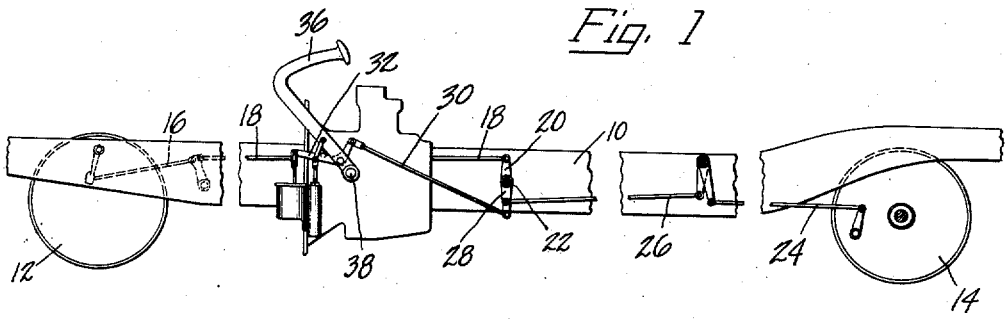
Figure 1 is a diagrammatic longitudinal vertical section through the chassis of an automobile having brakes of the type described.

In the arrangement selected for illustration, the invention is embodied in an automobile having a chassis frame 10 supported by front and rear wheels having front brakes 12 and rear brakes 14. The front brakes are shown as being operated by links 16 and 18 connected to arms 20 on a rock shaft 22, and the rear brakes are shown as being operated by links 24 and 26 connected to arms 28, also secured to the rock shaft 22. As the brakes themselves form no part of the present invention, further description is not considered necessary, as any desired particular construction may be adopted. The shaft 22 is rocked to apply the brakes by a link 30.

According to the present invention, the link 30 is connected to a bell crank lever 32 freely pivoted at 34 on a brake pedal or equivalent controlling member 36. The pedal 36 is shown as being fulcrumed at 38 and as being urged toward its idle position by a return spring 40 in the usual manner. The brake pedal 36 is formed with an abutment 42 arranged to engage, after a slight lost motion, an abutment 44 on the bell crank lever 32 to apply the brakes manually if the engine is not running, or if for any reason power is not available. This particular auxiliary connection for applying the brakes manually, including a device such as the bell crank lever 32 is claimed in Patent No. 1,580,221, granted to E. W. Seaholm upon April 13, 1926. It is not my intention to claim any subject matter claimed in the said Seaholm patent in this present application.

While the brakes can be applied manually as described if the engine is not running, it is the intention that whenever the engine is running they will be applied by power shown in the present instance as derived from the intake manifold. As one desirable construction permitting such application of the brakes, a piston 46 is provided with a connecting rod 48 connected to the bell crank lever 32 by a link 50, there being a slot 52 to allow lost motion when the brakes are applied manually. The piston 46 is arranged in a cylinder 54 which may, if desired, have a cover 56 to keep out dirt, and which is shown as being provided with ports 58 to allow the pressure of the atmosphere to act constantly on the upper surface of the piston.

Preferably formed as part of the same casting as the cylinder 54 is a smaller valve cylinder 60 shown as being constantly in communication with the cylinder 54 through a port 62. The valve cylinder 60 is also formed with an intake port 64 connected by a fitting 66 to a flexible tube 68 connected to the intake manifold of the engine, and with an exhaust port 70 leading from the cylinder 54 and at certain times communicating with the atmosphere through the open end of the valve cylinder 60.

Figure 2:
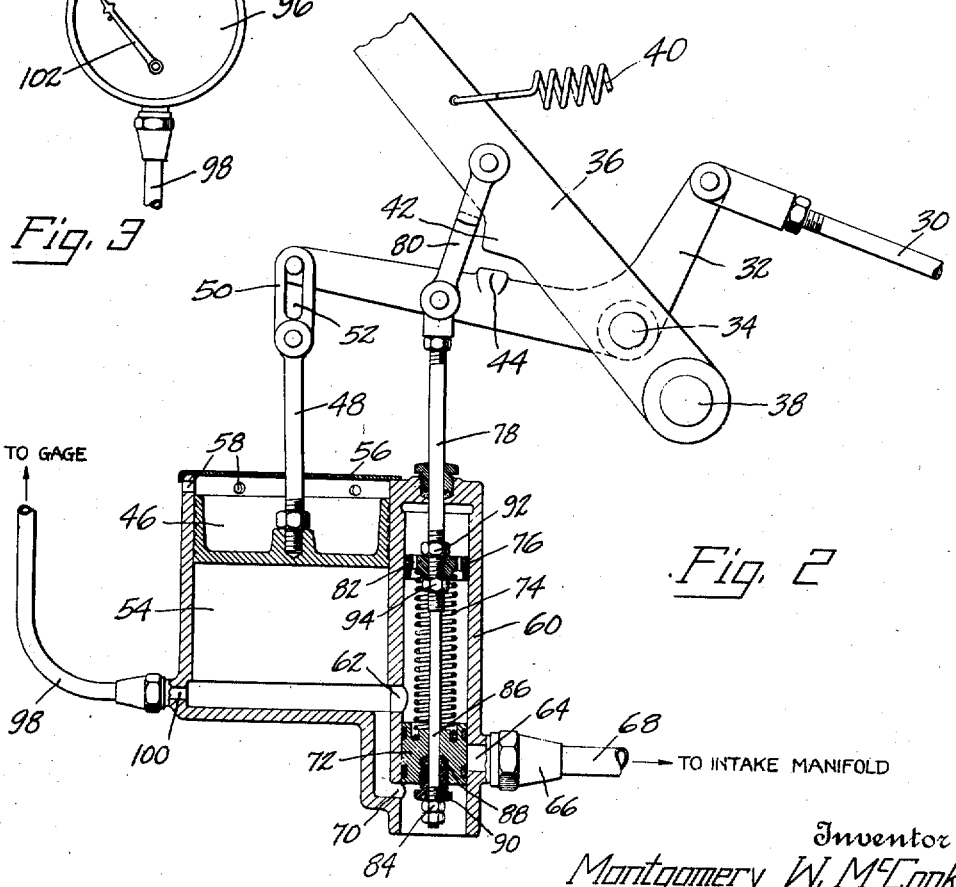
Figure 2 is a vertical section through the operating parts shown in side elevation in Figure 1.

Arranged in the valve cylinder 60 is a valve piston 72, shown in its idle position in Figure 2, that is, in the position which it occupies when the brake pedal is fully raised and the brakes are off. When the pedal is depressed to apply the brakes, the valve piston 72 is depressed by a spring 74 confined between the piston and an abutment 76 on a connecting rod 78, which is in turn pivotally connected to a link 80 pivoted to the brake pedal. The first depression of the pedal moves the valve piston 72 downwardly to a sufficient extent to close the exhaust port 70, and immediately thereafter continued depression of the valve piston begins to open the intake port 64. The suction from the intake manifold, acting through the ports 64 and 62, immediately begins to draw downwardly the piston 46, thus applying the brakes, and also immediately begins to urge the valve piston 72 upwardly. It is to be noted that the abutment 76 is provided with small ports 82 so that the vacuum in the cylinders 60 and 54 is always the same. When the upward pressure on the valve piston 72 becomes sufficient, as the vacuum builds up inside of the two cylinders, to balance the pressure downwardly through the spring 74 from the pedal 36, the valve piston moves upwardly to cut off the port 64. At this time the parts are balanced with the valve piston 72 closing both of the ports 64 and 70, and with the pressure on the brakes from the piston 46 a predetermined multiple of the reaction against the pedal 36 through the compression of the spring 74; because of the fact that the piston 46 is of greater area than the piston 72, and both are subjected to the same suction. For this reason the "feel" of the pedal is the same as if the brakes were being applied manually, except that it is always a predetermined fraction of the pressure which would be required if power were not being used.

If the pedal 36 is further depressed, the spring 74 will again urge the piston 72 downwardly, opening the port 64, until the vacuum in the two cylinders again builds up to such an extent that the valve piston 72 is again sucked up to cut off port 64, at which time the parts again balance with the pressure on the brakes the same multiple as before of the increased pressure on the brake pedal. In the particular arrangement shown in the drawings, the pressure applied to the brakes by the piston 46 is nine times the reaction against the brake pedal 36 through the spring 74. If the pressure on the pedal 36 is partly relieved, the pressure on the spring 74 will be relieved in a corresponding degree, whereupon atmospheric pressure will push the valve piston 72 upward in the cylinder 60 to open the exhaust port 70. As soon as the vacuum in the cylinders 54 and 60 is reduced to correspond to the new pedal pressure, the spring 74 will again push the valve piston 72 down to close the exhaust port 70, the various parts again balancing with the new pedal pressure and the new pressure on the brakes.

When the pedal 36 is completely released and returns to its idle position under the influence of the spring 40, and in order to guard against any possibility of the valve piston 72 sticking, the piston is engaged by an abutment formed by a pair of lock nuts 84 on a rod 86 passing axially through the piston 72 and which is shown as being a continuation of the connecting rod 78. The rod 86 passes through a packing 88 held compressed by a bushing 90 to prevent loss of vacuum in the two cylinders. Preferably, the abutment 76 is adjustable to vary the compression of the spring 74 and thus change the limits of operation of the valve, by being held between nuts 92 and 94 threaded on the connecting rod 78.

Figure 3:
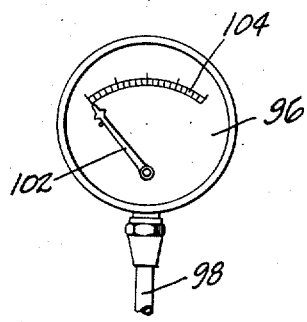
Figure 3 is a front elevation of the gage.

In order to indicate to the driver the pressure on the brakes, I consider it desirable to provide an indicator such as a gage 96 (Figure 3) connected by a flexible tube 98 to a port 100 formed in the cylinder 54. The particular gage shown in the drawings is of the well known type in which a Bourdon tube is arranged to expand and contract, and in so expanding and contracting operates a pointer 102 moving over a scale 104. A gage of this character is well adapted for mounting on the instrument board of a motor vehicle. It will be noted that the gage does not show the available power, but shows the power which is actually applied to the brakes.

While one illustrative embodiment of the invention has been described in detail, it is not my intention to limit its scope to that particular embodiment or otherwise than by the terms of the appended claims. The invention is shown embodied in brake-operating connections, and is well adapted for such use, but obviously at least some of the features are capable of useful embodiment in other connections than those shown, and for operating other mechanism than brakes.

I claim:

1. A valve for operating a fluid power motor comprising, in combination with said fluid power motor, a source of substantially uniform pressure, a source of different fluid pressure, a valve casing having an exhaust port connected to said first-named source of fluid pressure and having an intake port connected to said second-named source of fluid pressure and having port means connected to said fluid power motor, a valve member in the cylinder movable to different positions to connect said second source to said power cylinder or to connect the exhaust port to relieve the pressure in said fluid power motor or to disconnect both of the ports from said fluid power motor to isolate said fluid power motor, said valve member dividing said valve cylinder into two chambers, one of which is permanently connected through said port means with the power cylinder and the other of which is permanently connected with said first-named source of fluid pressure whereby the valve member is acted on by a differential pressure with a force which bears a definite relation to the power exerted by said fluid power motor, a manually movable part, and a spring interposed between the valve member and said part in such a manner as to urge the valve member in a direction to disconnect the exhaust port from the port means and to connect the intake port to the port means when said part is moved in a direction to compress the spring, the spring being arranged to yield to allow the valve member to move under the influence of fluid pressure in the cylinder to cut off the intake port.

2. Operating connections comprising, in combination, suction means for operating an operated means including a valve chamber having an intake port and an atmospheric port, a connection for supplying suction to said intake port, connecting means leading from the chamber for supplying suction therefrom to the suction operated means and for connecting said atmospheric port to said suction operated means, a valve member having pressure faces positioned in the chamber and movable to connect the suction operated means with either of said ports and arranged when in one position to disconnect the suction operated means from both ports, and yielding means to move the valve member to disconnect the atmospheric port from the suction operated means and to connect the intake port in such a manner that the suction acting on one face of the valve member and atmospheric pressure acting on another face of the valve member automatically move the valve member against the resistance of the yielding means to disconnect both ports from the suction operated means, and means for applying manual pressure to said yielding means and also for applying manual pressure to the operated means in case the suction means fails or is insufficient, in combination with a lost-motion device for positively returning the valve member to its predetermined initial position when the manually controlled device is returned to its idle position.

3. Operating connections for operating a brake comprising, in combination, suction means, a combined operating cylinder and valve chamber formed together, said valve chamber forming part of a valve for controlling said operating cylinder and having an intake port and an exhaust port, a connection from said exhaust port to the atmosphere, a connection for supplying suction from said suction means to said intake port, connecting means leading from the chamber for supplying suction therefrom to the operating cylinder which forms an operating device for the brake or for connecting said exhaust port to said operating cylinder, a valve member in the chamber movable from an idle position successively to disconnect the exhaust port from the operating cylinder and then to connect the intake port to the operating cylinder and arranged when in an intermediate position to disconnect both ports, and a manually controlled device and a spring arranged to be compressed thereby to move the valve member to disconnect the exhaust port and to connect the intake port in such a manner that the suction building up in the chamber automatically moves the valve member against the resistance of the spring to disconnect both ports.

4. Operating connections for operating a brake comprising, in combination, suction means, a combined operating cylinder and valve chamber formed together, said valve chamber forming part of a valve for controlling said operating cylinder and having an intake port and an exhaust port, a connection from said exhaust port to the atmosphere, a connection for supplying suction from said suction means to said intake port, connecting means leading from the chamber for supplying suction therefrom to the operating cylinder which forms an operating device for the brake or for connecting said exhaust port to said operating cylinder, a valve member in the chamber movable from an idle position successively to disconnect the exhaust port from the operating cylinder and then to connect the intake port to the operating cylinder and arranged when in an intermediate position to disconnect both ports, said valve member dividing the valve chamber into two portions, one of which is permanently connected with the operating cylinder through said connection from the chamber to the operating cylinder and the other of which is connected to the atmospheric connection, whereby the valve member is acted on by a differential of pressure with a force which bears a definite relation to the force exerted by the operating cylinder, and a manually controlled device and a spring arranged to be compressed thereby to move the valve member to disconnect the exhaust port from the operating cylinder and to connect the intake port to the operating cylinder in such a manner that the suction building up in the chamber automatically moves the valve member against the resistance of the spring to disconnect both ports, the structure being so arranged that relieving the physical pressure on the manually controlled device permits the suction in the chamber to move the valve member to connect the exhaust port to the operating cylinder to reduce the suction in the valve chamber to a corresponding degree, whereupon the spring is operative to move the valve member back again to disconnect the exhaust port.

5. Operating connections for operating a brake comprising, in combination, suction means, a combined operating cylinder and valve chamber formed together, said valve chamber forming a part of a valve for controlling said operating cylinder and having an intake port and an exhaust port, a connection from said exhaust port to the atmosphere, a connection for supplying suction from said suction means to said intake port, connecting means leading from the chamber for supplying suction therefrom to the operating cylinder which forms an operating device for the brake or for connecting said exhaust port to said operating cylinder, a valve member in the chamber movable from an idle position successively to disconnect the exhaust port from the operating cylinder and then to connect the intake port to the operating cylinder and arranged when in an intermediate position to disconnect both ports, and a manually controlled device and a spring arranged to be compressed thereby to move the valve member to disconnect the exhaust port and to connect the intake port in such a manner that the suction building up in the chamber automatically moves the valve member against the resistance of the spring to disconnect both ports, in combination with a lost-motion device for positively returning the valve member to a predetermined initial position when the manually controlled device is returned to its idle position.

6. A device of the class described for operating an operated member comprising, in combination, a connection to the external atmosphere, a source of suction, a power cylinder and valve chamber formed integral with and arranged adjacent to each other and constantly in communication with each other, port means by which said power cylinder communicates with said valve chamber, a piston in the cylinder so arranged that relative movement of the cylinder and piston applies force as described, a conduit leading from the valve chamber to said source of suction, valve mechanism controlling the conduit leading from said valve chamber to said source of suction, a passage leading from said cylinder and valve chamber to said connection to the external atmosphere, yielding means arranged to move the valve mechanism in a direction to admit suction to said valve chamber and cylinder and to yield to permit the valve mechanism to move to cut off the suction under the influence of an increase thereof building up in the valve chamber, said valve mechanism dividing the valve chamber into two portions, one of which is permanently connected through said port means with said power cylinder and the other of which is permanently connected through said passage with the atmosphere, whereby the valve mechanism is acted on by a differential pressure with a force which bears a definite relation to the force exerted by the power cylinder, and means for applying pressure to said yielding means and also for applying manual pressure to the operated member in case the suction means fails or is insufficient.

7. A device of the class described for operating an operated member comprising, in combination, a source of suction, a power cylinder and valve chamber arranged adjacent to each other and constantly in communication with each other, a conduit leading from said valve chamber to said source of suction, a piston in the cylinder so arranged that relative movement of the cylinder and piston applies power as described, a valve device controlling said conduit leading from said valve chamber to said source of suction, a passage leading from said cylinder and valve chamber to the external atmosphere, a port providing said communication between said chamber and said power cylinder, an operator-controlled member, said valve device dividing the valve chamber into two portions, one of which is permanently connected through said port with the power cylinder and the other of which is permanently connected with the external atmosphere, whereby the valve device is acted on by a differential of pressure with a force which bears a definite relation to the force exerted by the power cylinder, and a spring compressed by said operator-controlled member to move the valve device in a direction to admit suction to said valve chamber and cylinder and arranged to yield to permit the valve device to move to cut off the suction under the influence of an increase thereof building up in the valve chamber, and means for applying pressure to said operator-controlled member and also for applying manual pressure to the operated member in case the suction means fails or is insufficient.

8. A device of the class described for operating a brake comprisihg, in combination, a source of suction, adjacent power and valve cylinders having a connecting port, a power piston in the power cylinder, the valve cylinder having an intake port connected to said source of suction and an exhaust port connected to the atmosphere, each of said ports being at times connected to the power cylinder, a valve device in the valve cylinder arranged for movement first to disconnect the exhaust port to cut off the power cylinder from the atmosphere and then to connect the intake port to connect the power cylinder with the source of suction, and at an intermediate point to disconnect both ports to isolate the power cylinder, said valve device dividing the valve chamber into two portions, one of which is permanently connected through said connecting port with the power cylinder and the other of which is permanently connected with the external atmosphere whereby the valve device is acted on by a differential of pressure with a force which bears a definite relation to the force exerted by the power cylinder, a controlling member, and a spring compressed by the controlling member to move the valve member to disconnect the exhaust port from the power cylinder and to connect the intake port and to yield as the valve feels the effect of the suction building up in the two cylinders, in such a manner as automatically to return the valve member to its intermediate position with both of said ports disconnected to isolate said power cylinder, and means for applying pressure to said spring means and also for applying manual pressure to the brake in case the suction means fails or is insufficient.

9. A device of the class described for operating a brake comprising, in combination, a power cylinder and piston, a valve chamber, communicating passages connecting said power cylinder and said valve chamber, the chamber having intake and exhaust ports and arranged for communication with the cylinder through said communicating passages, a yieldingly operated floating valve member in the valve chamber controlling fluid pressure for the power cylinder and arranged to be balanced automatically by a uniform fluid pressure on one side and by operating pressure and a different fluid pressure on the other side, one of said fluid pressures being the pressure of the atmosphere, said valve member dividing the valve chamber into two portions, one of which is permanently connected with the power cylinder through one of said communicating passages and the other of which is connected to the uniform fluid pressure, whereby the valve member is acted on by the differential of pressure with a force which bears a definite relation to the force exerted by the power cylinder and whereby when the operating pressure is balanced by the differential of pressure the valve member moves to disconnect both ports to isolate said power cylinder from the intake port and the exhaust port of the valve chamber to form a lapped position in such a manner as to hold the power piston stationarily supported with power applied, and means for applying operating pressure to said valve member to move said member to a position to connect the intake port of the valve chamber with the power cylinder to apply operating force to said power cylinder by differential fluid pressure and also for applying manual pressure to the operated member in case the differential pressure power fails or is insufficient.

MONTGOMERY W. McCONKEY.